(12) United States Patent
Joffe

(10) Patent No.: US 6,812,479 B2
(45) Date of Patent: Nov. 2, 2004

(54) SAMPLE POSITIONING METHOD FOR SURFACE OPTICAL DIAGNOSTICS USING VIDEO IMAGING

(75) Inventor: Michael Joffe, Wrentham, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/874,420

(22) Filed: Jun. 5, 2001

(65) Prior Publication Data
US 2002/0179865 A1 Dec. 5, 2002

(51) Int. Cl.[7] .................................................. G01V 8/00
(52) U.S. Cl. .............................. 250/559.31; 250/201.6; 250/559.39; 250/201.8; 356/623
(58) Field of Search .......................... 250/201.4, 201.8, 250/559.29, 559.31, 559.3, 559.39, 206.1, 201.6, 201.3, 208.1; 356/609, 622, 623, 401, 375

(56) References Cited

U.S. PATENT DOCUMENTS

| | | | | |
|---|---|---|---|---|
| 3,187,185 A | | 6/1965 | Milnes | 250/222 |
| 4,335,942 A | * | 6/1982 | Tsunekawa et al. | 396/133 |
| 4,614,432 A | * | 9/1986 | Kuniyoshi et al. | 250/548 |
| 4,701,053 A | * | 10/1987 | Ikenaga | 250/548 |
| 4,872,747 A | * | 10/1989 | Jalkio et al. | 359/669 |
| 5,151,608 A | * | 9/1992 | Torii et al. | 250/559.38 |
| 5,633,721 A | * | 5/1997 | Mizutani | 356/401 |
| 5,703,351 A | * | 12/1997 | Meyers | 250/201.2 |
| 5,745,242 A | * | 4/1998 | Hata | 250/559.3 |
| 5,834,767 A | * | 11/1998 | Hasegawa et al. | 250/237 G |
| 5,969,820 A | * | 10/1999 | Yoshii et al. | 250/201.6 |

FOREIGN PATENT DOCUMENTS

CH 616805 G 4/1980 .......... G01B/11/22

\* cited by examiner

Primary Examiner—Thanh X. Luu
Assistant Examiner—Stephen Yam

(57) ABSTRACT

Disclosed is a position system and method for correcting the position of a workpiece during a manufacturing process. The system includes a light generating means for projecting a light beam onto the top surface of the workpiece at a predetermined angle and a video capturing means for detecting the light received by the workpiece. The light projected on the workpiece is scanned to determine the deviation direction and the deviation amount from a predetermined reference point, then the position of the work piece is adjusted based on a positional relationship between a digital image of the projected light on the surface of said workpiece and the predetermined reference image.

2 Claims, 3 Drawing Sheets

SAMPLE POSITIONING METHOD FOR SURFACE OPTICAL DIAGNOSTICS USING VIDEO IMAGING

BACKGROUND OF THE INVENTION

1. Field of Invention

The present invention relates to a sample positioning system, particularly to a method and system for scanning a laser beam on a workpiece to perform an automatic vertical positioning of the workpiece on the basis of a lateral movement pattern of the laser beam projected thereon.

2. Description of the Invention

In general, the technique for surface analysis, specifically an opto-acoustic film measurement, requires an accurate placement of the probed sample with respect to the instrument hardware. To achieve this, the measurement accuracy requires a precise positioning of the sample surface along the normal axis. Various types of laser pattern generation systems have been proposed using multiple laser beams that are optically modulated to perform the surface analysis of a particular workpiece. One way to detect such a pattern is to use a commercially known product, "optoNCDT", made by MICRO-EPSILON™ (a subsidiary of MICRO-EPSILON Messtechnik GmbH & Co. KG located in D-94493, Ortenburg, Germany).

Basically, there are two approaches to general surface analysis to find the optimal-signal position of the sample. One approach is based on signal optimization, and the other approach relies on some auxiliary optical focusing scheme. In the former approach, the sample position is continually scanned through the region and compared to an optimal reference point. Then, during operation, the sample position is corrected as the sample deviates from the optimal reference point. Here, the optimal reference point represents the desired sample position to obtain optimal performance in a particular process, such as a waffering process. Currently, the time response of the instrument to adjust back to the optimal point is long and impractical to implement. In comparison, the latter approach employs video imaging of some feature on the sample surface and adjusts the position of the sample based on the point of maximum contrast. However, this technique requires the availability of some feature with sharp edges on the sample, thus not applicable to flat surface samples, such as blanket metal films. Although the latter approach is usually faster than the former optimization method, the maximum contrast search still requires a time-consuming positioning delay while scanning the sample. In addition, other optical focusing techniques employing a special image created with a dedicated optical setup are required, adding costs and complicating the instrument design.

In summary, the conventional methods are slow in adjusting the position of a sample to coincide perfectly with an optimum-signal point. Moreover, very fine alignment and expensive measuring devices are required. Accordingly, there is a need for an efficient and economical mechanism that is capable of performing a rapid determination of the surface position, while providing active feedback control for signal optimization.

SUMMARY OF THE INVENTION

The present invention relates to a method and system that is capable of scanning a laser beam on a workpiece to perform an automatic vertical positioning of the workpiece in a particular manufacturing process.

Accordingly, the present invention provides a positioning system, which includes a light generating means for projecting a light beam onto the top surface of the workpiece at a predetermined angle and a video capturing means for detecting the light received by said workpiece for processing a deviation direction and a deviation amount based on the positional relationship between a digital image of the projected light on the surface of the workpiece and a predetermined reference image. The method of adjusting the vertical position of a workpiece is performed by the following steps: transmitting a light beam onto the top surface of the workpiece at a predetermined angle relative to a normal axis associated with the workpiece; detecting the light beam projected on the top surface of the workpiece; determining a center point of the detected light beam; determining a lateral distance between the center point of the detected light beam and a predetermined reference point; converting the determined lateral distance to a corresponding vertical distance using trigonometry; and, adjusting the vertical position of the workpiece based on the vertical distance outcome.

BRIEF DESCRIPTION OF THE DRAWINGS

The above and other features and advantages of the present invention will become more apparent from the following detailed description when taken in conjunction with the accompanying drawings, in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. Moreover, for the purpose of clarity, detailed descriptions of well-known devices, circuits, and methods are omitted so as not to obscure the description of the present invention with unnecessary detail.

According to the present invention, a position-sensitive detector 10 is provided to quickly adjust the vertical placement of the sample substrate 18 during a manufacturing process, i.e., a wafer thin-film process, by detecting the lateral shifting of light illumination on a sample substrate 18. In various manufacturing stages, it is highly desirable to maintain the sample substrate 18 at an optimal-signal reference point. For example, the wafer for a mask to be etched is typically mounted on an X-Y-Z movable platform (now shown) known in the art. Depending on the variation in the etching depth of the sample substrate 18, the performance of the final substrate is affected. Therefore, it is necessary to maintain the vertical displacement of the sample substrate to a predetermined position during the manufacturing process.

Figure 1:
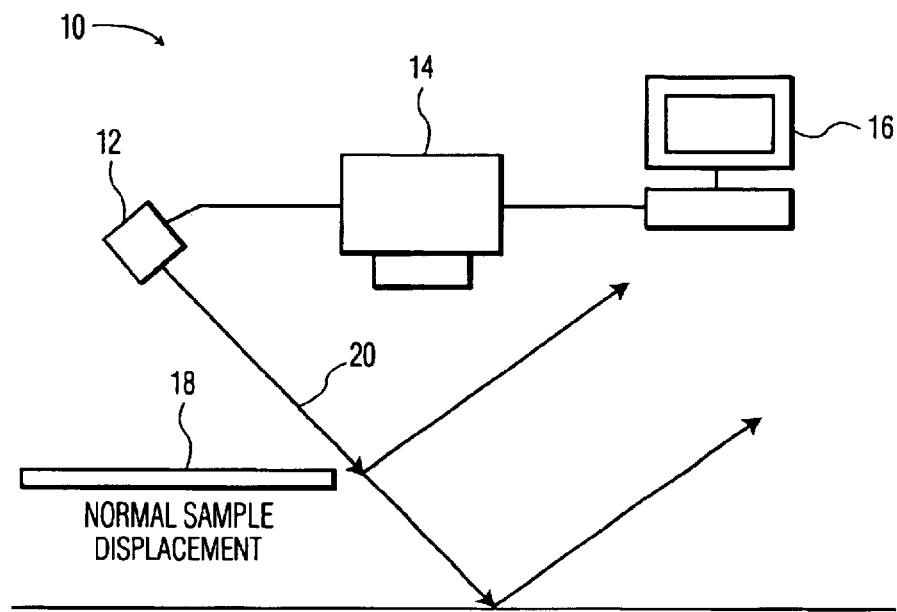
FIG. 1 illustrates an exemplary embodiment of the present invention.
Figure 2:
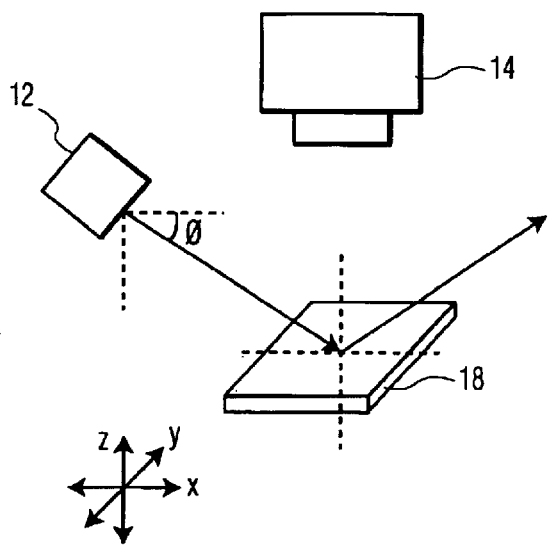
FIG. 2 illustrates another view of the embodiment of the present invention.
Figure 3:
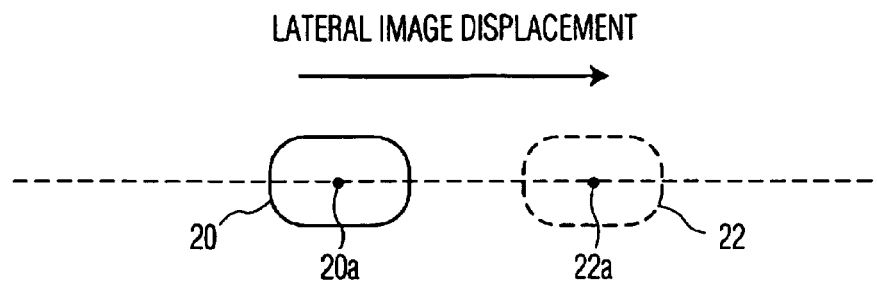
FIG. 3 illustrates a top view of the sample surface depicting a light beam projected thereon according to the present invention.

Referring to FIG. 1, a position-sensitive detector 10 that is capable of adjusting the vertical displacement of a planar sample substrate 18 or workpiece according to the present invention includes a light source 12, a video capturing means 14, and a computer 16. In operation, the light source 12 emits light, which is directed onto the surface of the sample substrate 18 at a predetermined angle as shown in FIG. 2. Preferably, the focused image of light 20 projected on the sample substrate 18 is symmetrical. In the embodiment, the sample substrate 18 is arranged in a substantially horizontal orientation, and the light source 12 is arranged above the sample substrate 18 at a predetermined angle. The sample substrate 18 is movable along the X-direction and Y-direction using a moving means (not shown) in the X-Y plane to a pre-selected optimal-signal point. Even if a sample substrate 18 with a given size is replaced with another substrate with a size different from the given size, the light pattern having a predetermined size can be always accurately formed on the surface of the sample substrate 18. The video capturing means 14 scans and produces a digital image of the light received by the sample substrate 18 when the sample substrate 18 is shifted in the Z-direction during the manufacturing process, as shown in FIG. 3. Thereafter, the signal processing algorithm then coverts the digitized image into a sample position measurement.

Although the focused image of light is illustrated by the smaller circles for illustrative purposes, it should be understood that the present invention can support other illumination shapes. Also, it is noted that the light source 12 can be a laser diode (LD) or any other well-known emission source that is capable of producing a surface image such as light-emitting diode (LED), etc. Similarly, the video capturing means 14 can be a conventional video camera, a charge-coupled device (CCD), a charge injection device (CID), a photodiode array, or other auxiliary sub-systems, such as an image intensifier.

In operation, when the alignment of the sample substrate 18 is shifted or deviated from a predetermined optimal-signal point, the present system facilitates a speedy scanning of the light projected onto the sample substrate 18 and allows a mechanical movement of the sample 18 back to an optimal-signal point based on the lateral shifting image of the light illumination within the volume of the sample 18. To accomplish this, the video capturing means 14, which images the surface from the normal angle, would record an elliptic spot, which is formed using a laser beam. As shown in FIG. 3, when the pattern of illumination 20 detected by the video capturing means 14 has changed, for example, when the grid of illuminated points 20 is shifted (shown in a dotted line) due to the vertical movement of the sample substrate 18, the detector 10 determines the amount of laterally shifted displacement from a reference point 20*a*, then computes the corresponding corrective vertical displacement using trigonometry. Hence, the detector 10 can adjust the vertical displacement of the sample substrate 18 back to the reference point 20.

Figure 4:
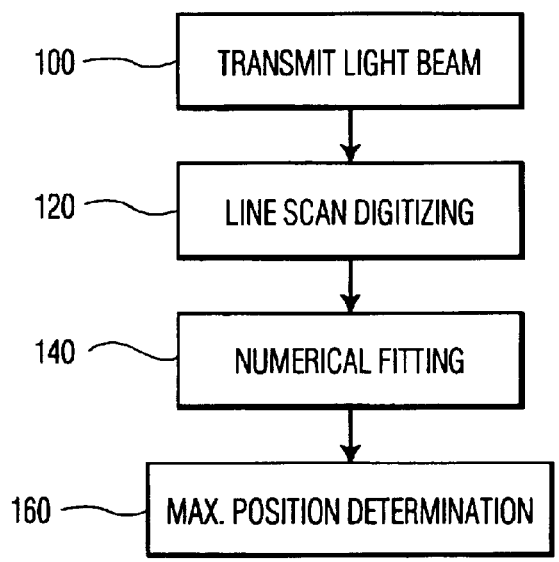
FIG. 4 is a flow chart illustrating the steps in determining the lateral displacement of the light beams projected on the sample surface according to the present invention.

FIG. 4 illustrates a novel method for scan illumination to adjust the vertical displacement of the sample 18, so that the vertical displacement of the sample 18 coincides with the optimal-signal point. In general, this process is implemented in software running on the computer 16, which may be a specialized digital signal-processing engine. As indicated in the flow chart of FIG. 4, the operation according to the present invention involves multiple image acquisition steps. In step 100, the computer 16 produces appropriate control signals to drive the light source 12 to produce a light beam and transmit the light beam onto the sample substrate 18 at a predetermined angle, θ. In step 120, the reflected line on the sample substrate 18 is scanned via the video capturing means 14 and the detected illuminated points are digitized. This illumination pattern may be a grid of illuminated points, a set of lines or other pattern depending on particular imaging requirements. Hence, data is acquired from the video capturing means 14 and stored in the computer 16, following exposure to the pattern of illumination.

Figure 5:
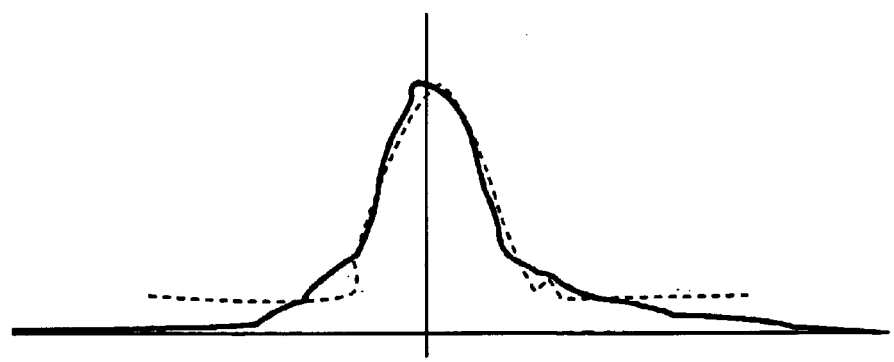
FIG. 5 is a graphical illustration of one of the steps executed in FIG. 4 according to the present invention.

In step 140, the computer 16 samples the line scan digitally and a discrete sampling is performed with an appropriate model function such as Gaussian, as shown in FIG. 5. The continuous and discrete-sampled forms of the Gaussian distributions are illustrated in FIG. 5 in 2D plots. A line fitting is performed using the illumination profile sampled through each of these Gaussian-derived peaks. Thereafter, in step 160, a calibration image is used to determine maximum peaks in each of the calibration component images, allowing determination of the relevant parameters, such as the center location 22*a*, the peak amplitude, and the half-width. Based on this model, it is possible to compute the integral illumination of light that is detected by the video capturing means 14. Accordingly, the center location 22*a* of the illumination point 22 can be determined.

Figure 6:
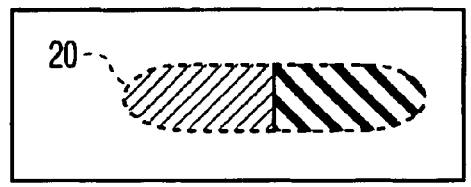
FIG. 6 is a graphic illustration of the sample surface being projected with light beams according to the present invention; and, FIG. 7 illustrates a flow chart of executing the embodiment of the present invention.

The chosen embodiment of the present invention is a computer software executing within a computer system 16. Computer programs (or computer control logic) are stored in the main memory. Such computer programs, when executed, enable the computer system 16 to perform the function of the present invention as discussed in the preceding paragraph. Accordingly, such computer programs represent controllers of the computer system. However, it is noted that the capability of the computer system 16 can be implemented in the video capturing means 14. In addition, as noted earlier, the line scan digitizing step 120, the numerical fitting step 140, and the maximum position determination step 160 can be readily achieved with well-known devices. Alternatively, a pattern recognition device that is well known in this art can be utilized to determine the center location 22*a* of the elliptical pattern 22. Furthermore, it is noted that the present invention does not strongly depend on the surface condition of the sample substrate 18 to achieve the vertical sampling positioning. The line scan or pattern recognition should allow focusing even on sample materials with different reflective properties. Hence, the illumination spot 20 can be imaged even on a blanket featureless film without reliance on the surface characteristics. For example, if the illuminated spot 20 falls on two distinct adjacent regions with different surface characteristics, the elliptic spot 20 would appear as non-uniformly illuminated. However, even in this case, the conventional line scan or pattern recognition software can find and outline the border of the elliptic spot, as shown in FIG. 6.

Figure 7:
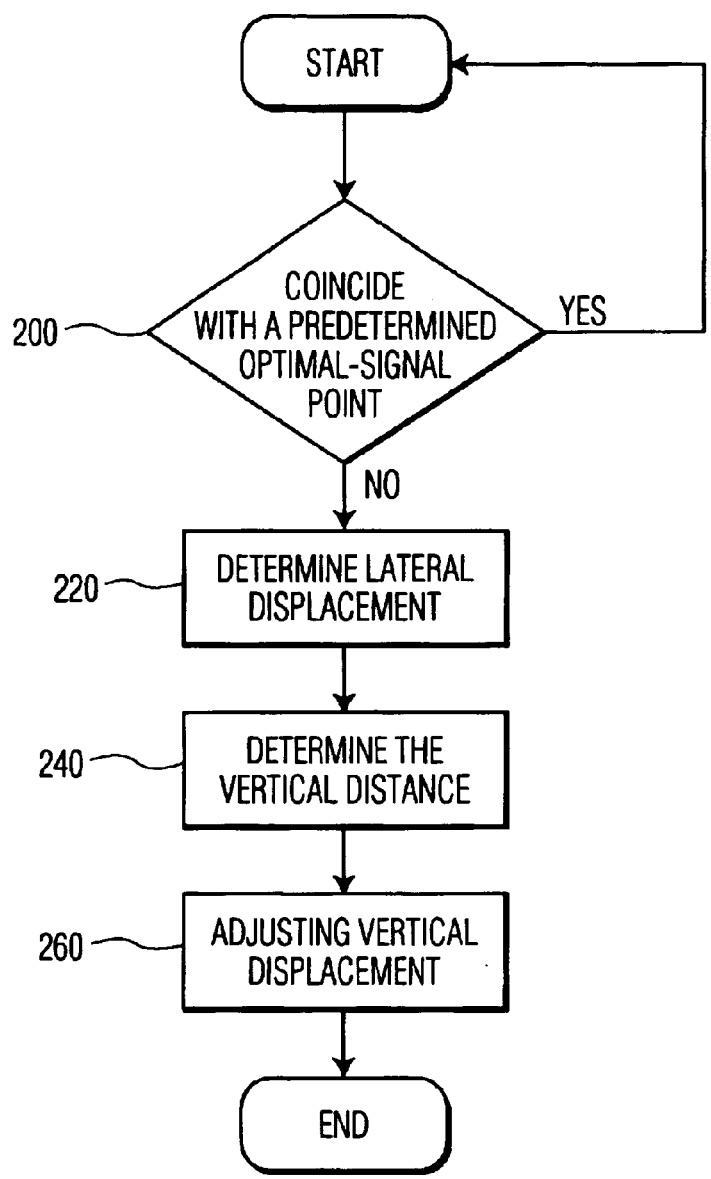

Now, a detailed description of determining the laterally shifted displacement of the light illumination with the sample substrate 18 is explained in conjunction with FIG. 7. FIG. 7 illustrates a simple but effective method for determining the vertical movement of the sample substrate 18 based on the lateral shift of the light focused on the surface thereof. In step 200, it is determined whether the center position of the focused light beam 22 detected by the video capturing means 14 deviated from a predetermined optimal-signal point 20a. If they coincide, the process is repeated again; otherwise, the functions described in FIG. 4 are performed in step 220. After determining a shift in the lateral direction, the vertical distance necessary to adjust the sample substrate 18 back to the predetermined optimal-signal point 20a is computed in step 240 according to a well known trigonometry using a known incident angle of the beam to the surface of sample substrate 18. For example, for a 45-degree incident angle of the illuminating beam the vertical displacement is exactly equal to the lateral displacement of the spot on the surface. Finally, in step 260, the vertical deviation of the sample substrate 18 is adjusted on the basis of the direction and the lateral displacement of the light beam 22 on the surface of the sample substrate 18. The vertical position of the sample substrate 18 is adjusted so that the centered light beam 22a received within the sample surface can coincide with the image of the predetermined optimal-signal point 20a.

Accordingly, the inventive approach allows rapid and immediate readout of the sample position. The direction and amplitude of the lateral displacement determines the size and the direction of the corrective action. Another advantage of the approach is that it readily allows correlating optical "focusing" with the signal optimization by continually scanning the sample surface and comparing to a reference set point. An additional advantage of the approach is that it does not strongly depend on the surface condition.

In summary, the present invention is capable of controlling the position of samples in surface-probing instruments, specifically the opto-acoustic thin-film thickness measurement. Thus, the present invention provides an economic way of integrating a sample position measurement into an optical metrology tool without adding extra sensors and laser sources. The invention also provides a way to obtain necessary positioning information using hardware, which is already a part of the metrology instrument. Therefore, it should be apparent to those skilled in the art that certain advantages of the system have been achieved. However, the foregoing is to be constructed as only being an illustrative embodiment of this invention. Persons skilled in the art can easily conceive of alternative arrangements providing a function similar to this embodiment without any deviation from the fundamental principles or the scope of this invention.

What is claimed is:

1. A method for adjusting the vertical position of a workpiece, said method comprising the steps of:

transmitting a light beam onto the top surface of said workpiece at a predetermined angle relative to a normal axis associated with said workpiece;

detecting the light beam projected on the top surface of said workpiece;

detecting a lateral shift of said detected light beam on the top surface of said workpiece, said shift occurring as a result of a vertical translation of said top surface; and, converting said detected lateral shift to a corresponding vertical distance using trigonometry, wherein the step of detecting said detected light beam comprises the steps of:

monitoring a boundary of said detected light beam;

generating signals representing positions of said boundary; and, evaluating said signals for determining a center point of said boundary.

2. The method of claim 1, further comprising the step of positioning said workpiece based on said converted vertical distance.

* * * * *